May 9, 1933.　　　　W. W. HALLE　　　　1,907,797
CONTAINER
Filed Feb. 5, 1930
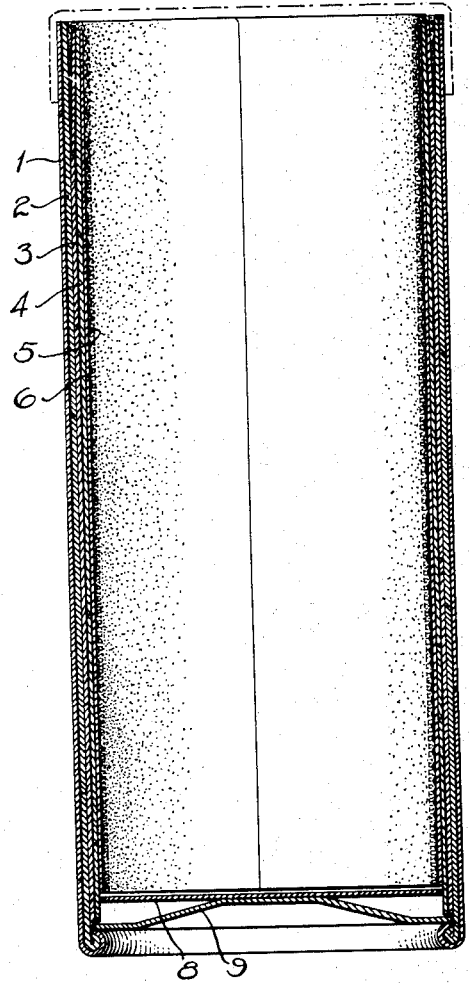
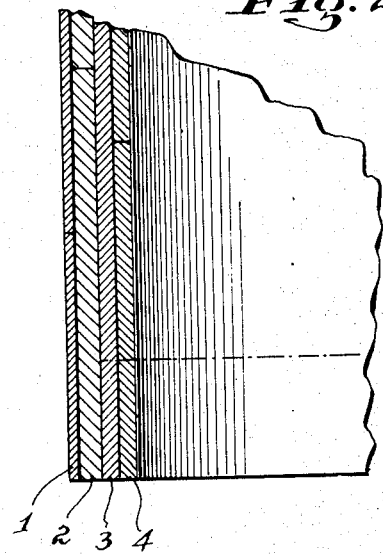
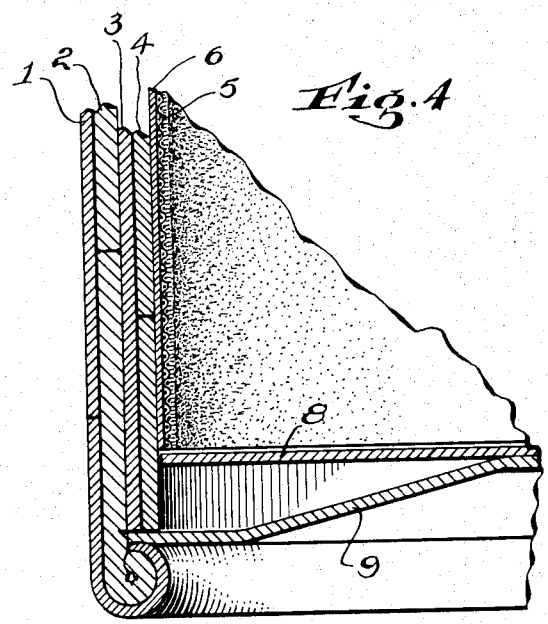
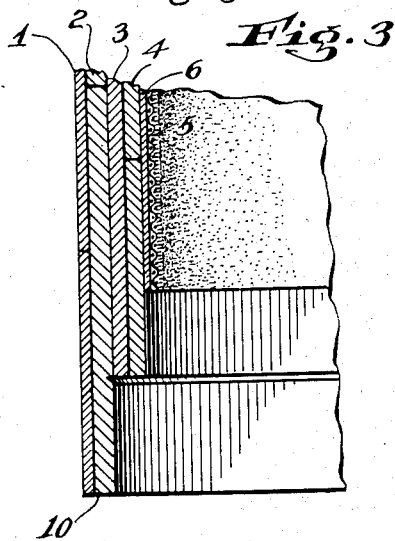
INVENTOR.
William W Halle
BY
ATTORNEYS.

Patented May 9, 1933

1,907,797

UNITED STATES PATENT OFFICE

WILLIAM W. HALLE, OF NEWARK, NEW JERSEY, ASSIGNOR TO SEELEY TUBE & BOX COMPANY, OF NEWARK, NEW JERSEY, A CORPORATION OF NEW JERSEY

CONTAINER

Application filed February 5, 1930. Serial No. 425,951.

The invention is an improved pasteboard container for holding such fragile articles as wax sound records of dictating machines, and its object is to improve the durability of such containers and of containers generally, as well as to simplify their manufacture, as will hereinafter appear.

Fig. 1 of the accompanying drawing represents a longtudinal central section of the form at present preferred of the invention, Fig. 2 a magnified section of its body wall, Fig. 3 a similar cross section of the bottom seam in an intermediate stage of manufacture and Fig. 4 a similar section of the completed seam.

The container body, which is cylindrical, is made by winding successive layers of ordinary chip-board ribbon stock on a mandrel in the usual way but omitting any glue between two of the intermediate layers. In the present case there are four such layers marked 1, 2, 3 and 4 respectively, wound spirally upon each other, with alternately reversed pitch as usual, layers 1 and 2 and layers 3 and 4 being respectively glued to each other, but layers 2 and 3 being unglued and secured to each other only by the friction produced by the winding. The number of layers may be as desired. Preferably the outermost of the two unglued layers, i. e. the layer 2, is made of slightly heavier stock than the others for a reason presently explained. The resulting tube is cut in proper lengths to form the container body, which is thus, in the present case, a four-ply body and correspondingly strong. For use in holding wax records such a body is commonly provided with a lining of nap-sheeting or soft flannel-like fabric 5 carried on a chip-board lining sleeve 6, which sleeve may be introduced into the body either before or after the bottom closure is applied. The nap-sheeting is glued to the face of the sleeve and its top edge is turned over the top edge of the sleeve to make a neat finish at the top of the container, as indicated. This is done while the sleeve is flat, after which it is introduced into the body, in a curled condition and allowed to expand against the inner face of the body being secured thereto by a couple of dabs of glue.

In order to apply the bottom or end closure to the tubular body, the two inner layers, 3 and 4, are skived off about along the dotted line in Fig. 2, to form an interior rebate shoulder as indicated at 7 in Fig. 3. This cutting is done by an internal expanding cutter rotated in the end of the body and set to cut through just those layers which are inside of the unglued interface, the resulting ring, composed of the severed ends of such layers (3 and 4) being easily separated from the body because of the absence of glue. The layer 2 is of greater thickness than the others so that the cut made by the skiving tool, which must necessarily pass entirely through the two inside layers, scoring the layer 2, will not unduly weaken it. When the rebate has thus been formed, the circular cardboard bumper disc 8 is inserted and laid against the end of the lining sleeve 6, and then a hard fibre bottom disc 9 is placed on the rebate shoulder 7 and finally the reduced and relatively thin rebate lip or flange 10, produced by the skiving, is crimped over inwardly upon the disc 9 binding it securely in place, against the shoulder. Because this rebate lip is of proper thickness and thinner than the body wall, which latter must be thick in order to be strong, it can be curled over and upon itself to form a crimped seam or joint which is materially stronger than it would be if it were attempted to make it by curling over the full thickness of the body wall as heretofore. The crimping or curling over can thus approximate 360° which makes a securely locked seam. It will be understood therefore that according to this invention, the location of the unglued interface and the number of layers removed to make the rebate are predetermined to leave a rebate lip of length and thickness suited to make the most efficient crimp, least likely to uncurl in use. Obviously the particular thickness depends on the material of the ribbon stock and to some extent on the diameter of the container and will therefore vary for different styles of containers but the manufacturer will have no difficulty in determining this detail. A decorative paper covering is ordinarily applied to the outer face of the body, and is included in the crimp. It is not shown in the drawing.

The hard fibre bottom disc 9 is shown bossed inwardly at its centre to form a central upstanding seat for the bumper disc 8, which latter is confined in place by the lower end of the lining sleeve 6 and will be understood to be intended to have sufficient clearance from the body wall to act as a yielding cushion to the pressure or impact of a wax record, thus protecting the latter from injury.

It will be understood also that the crimped bottom seam or rim contributes to the protection afforded by the bumper disc, inasmuch as it is present to absorb and distribute shock when the disc has been distorted to or beyond the normal limit of its movement in the space provided, thereby making this device an exceptionally safe record container.

I claim:

1. A wax record holder comprising a container body having its wall formed of a plurality of superposed layers of spirally wound ribbon stock, certain of the inward layers being cut shorter than the outward layers to form a shouldered seat, a closure disc on said seat, a bumper disc above said closure disc centrally supported thereon so that its rim portion may yield to pressure upon or by the record, a soft-surfaced lining sleeve above said bumper disc confining the same in the container, and the extended ends of said outward layers of the body wall being crimped over and upon said closure disc forming a cushioning seam adapted to supplement the cushioning effect afforded by said bumper disc.

2. A wax record container comprising a container body wall formed of at least four layers of spirally wound ribbon stock, all of the interfaces between layers being glued together except a middle interface, a closure disc seated on the ends of those layers which are inward of said unglued interface, there being at least two such inward layers, forming a seat for said closure disc, a soft-surfaced lining sleeve secured within and to said inward layers above said seat and a yieldably mounted bumper disc of less diameter than said closure disc movably confined between the same and said lining sleeve, the extended ends of the layers of stock outward of said unglued interface being crimped over upon said closure disc, there being at least two such outward layers whereby the crimp forms a cushioning member supplementing the cushioning effect of said bumper disc.

In testimony whereof, I have signed this specification.

WILLIAM W. HALLE.